(12) United States Patent
Tsukagoshi et al.

(10) Patent No.: US 7,675,838 B2
(45) Date of Patent: Mar. 9, 2010

(54) OPTICAL RECORDING MEDIUM

(75) Inventors: Takuya Tsukagoshi, Sagamihara (JP); Koji Mishima, Chuo-ku (JP); Daisuke Yoshitoku, Chuo-ku (JP)

(73) Assignee: TDK Corporation, Tokyo (JP)

( * ) Notice: Subject to any disclaimer, the term of this patent is extended or adjusted under 35 U.S.C. 154(b) by 1068 days.

(21) Appl. No.: 11/222,835

(22) Filed: Sep. 12, 2005

(65) Prior Publication Data

US 2006/0077877 A1    Apr. 13, 2006

(30) Foreign Application Priority Data

Sep. 13, 2004    (JP) ............................. 2004-266060

(51) Int. Cl.
| | |
|---|---|
| *G11B 7/24* | (2006.01) |
| *G11B 3/70* | (2006.01) |
| *G11B 5/84* | (2006.01) |
| *G11B 7/26* | (2006.01) |

(52) U.S. Cl. .................................. 369/275.1; 369/283

(58) Field of Classification Search ............. 369/275.1, 369/275.3, 275.4, 283
See application file for complete search history.

(56) References Cited

U.S. PATENT DOCUMENTS

| 5,251,198 | A |   | 10/1993 | Strickler |         |
|-----------|---|---|---------|-----------|---------|
| 5,608,715 | A | * | 3/1997  | Yokogawa et al. | 369/275.1 |
| 5,764,619 | A | * | 6/1998  | Nishiuchi et al. | 369/275.1 |
| 5,846,627 | A |   | 12/1998 | Hong |         |
| 5,972,457 | A | * | 10/1999 | Matsuishi et al. | 428/64.1 |
| 6,333,913 | B1 | * | 12/2001 | Yoshinari et al. | 369/283 |
| 6,353,592 | B1 | * | 3/2002  | Kashiwagi et al. | 369/283 |
| 2003/0103431 | A1 |   | 6/2003  | Kuroda |         |
| 2003/0169670 | A1 | * | 9/2003  | Hirayama | 369/112.23 |
| 2003/0224215 | A1 | * | 12/2003 | Kondo et al. | 428/694 ML |
| 2005/0003302 | A1 |   | 1/2005  | Yamamoto et al. |         |
| 2005/0253210 | A1 |   | 11/2005 | Uno et al. |         |

FOREIGN PATENT DOCUMENTS

| EP | 1 170 738 A2 | 1/2002 |
| EP | 1 463 047 A1 | 9/2004 |
| JP | A 2001-155380 | 6/2001 |
| JP | A-2002-279692 | 9/2002 |
| JP | A 2004-213720 | 7/2004 |
| WO | WO 97/23870 | 7/1997 |
| WO | WO 2004/027770 A1 | 4/2004 |

OTHER PUBLICATIONS

Kitaura et al., "Multi-Layer Write-Once Media with Te-O-Pd Films Utilizing a Violet Laser," Proceedings of SPIE, vol. 4342, pp. 340-347 {Jan. 2002}.

Japanese Office Action for Corresponding Japanese Application No. 2004-266060, Issued Jun. 9, 2009.

* cited by examiner

*Primary Examiner*—Joseph H Feild
*Assistant Examiner*—Nicholas Lee
(74) *Attorney, Agent, or Firm*—Oliff & Berridge, PLC

(57) ABSTRACT

A multilayer optical recording medium comprises four recording layers including an L0 layer, an L1 layer, an L2 layer, and L3 layer laminated between a substrate and an optically transparent cover layer and optically transparent spacer layers each provided between the recording layers. The L2 layer has the negative dependence of the reflectance on the incident angle of a laser light beam for reproduction. Crosstalk can be effectively reduced by the relation between the configuration of the respective recording layers and the crosstalk.

10 Claims, 13 Drawing Sheets

(A)

(B)

(C)

OPTICAL RECORDING MEDIUM

BACKGROUND OF THE INVENTION

1. Field of the Invention

The present invention relates to an optical recording medium and, in particular, to an optical recording medium comprising three or more recording layers.

2. Description of the Related Art

An optical recording medium such as a CD (compact disc) or a DVD (digital versatile disc) has been widely employed as a recording medium for recording digital data. In order to increase storage capacity in such an optical recording medium, a multi-layer optical recording medium has been developed, in which a data recording layer has a multilayer structure. In such a multilayer optical recording medium, the recording layers are laminated with an optically transparent spacer layer sandwiched therebetween.

In the above multilayer optical recording medium, upon reproducing a recording mark on a recording layer, light components reflected from the other recording layers are generated. If the amount of the reflected light components or the distance between the recording layers is changed for any reason, the variation (hereinafter referred to as a crosstalk variation) is superposed on the reproduction signal as noise.

In order to reduce the effect of the above-described interlayer crosstalk, an optical recording medium, for example, disclosed in Japanese Patent Laid-Open Publication No. 2004-213720 has been proposed in which each of the recording layers is provided at different interlayer distances.

SUMMARY OF THE INVENTION

In view of the foregoing problems, various exemplary embodiments of this invention provide an optical recording medium in which interlayer crosstalk is efficiently reduced through utilizing the relation between the reflectance of the recording layer of a multilayer optical recording medium and the crosstalk.

The present inventor has made extensive studies and has found that third order crosstalk makes up the most of the interlayer crosstalk when the overall thickness of an optically transparent layer is 5 μm or thicker and that almost all of the third order crosstalk is confocal crosstalk. Further, the present inventor has found that almost all of the effect of the interlayer crosstalk is caused by the confocal third order crosstalk in an actual four-layer optical recording medium comprising optically transparent spacer layers having a thickness of about 50 μm.

Next, the abovementioned the "third order crosstalk" and the "confocal crosstalk" will be described.

As shown in FIG. 18A, an optical recording medium 1 comprises, for example, four recording layers (an L0 layer 16, an L1 layer 18, an L2 layer 20, and an L3 layer 22) provided between a substrate 12 and an optically transparent cover layer 14. Upon reproduction from, for example, the L0 layer 16, a certain component of reproduction light incident on the optically transparent cover layer 14 is reflected only from the L0 layer 16 and leaves from the optical recording medium, and this component is a signal light component. On the other hand, some components of the reproduction light are reflected only once from the L1 layer 18, the L2 layer 20, or the L3 layer 22 and leave from the optical recording medium. These components are the so-called crosstalk light but are referred to as "first order crosstalk (light)" to distinguish from a multi-reflection component described hereinafter. The multilayer optical recording medium has a laminated structure formed of recording layers having a finite reflectance, and thus the multi-reflection components reflected from the recording layers a plurality of times are generated.

Among the multi-reflection components, only the light components which have experienced reflections odd times from the recording layers actually leave from the recording medium. Of these light components, the light components having the least number of reflections experience reflections three times, and these components are referred to as the "third order crosstalk (light)."

FIG. 18A shows an example of the third order crosstalk, and this component is reflected from the L2 layer, the L3 layer, and L1 layer in this order. In addition to these components, the multi-reflection components include the components reflected 5 times, 7 times, and more. However, the intensity of the light is attenuated by each reflection, and thus the multi-reflection components reflected 5 times or more can be neglected. In FIG. 18A, the dotted line represents the optical path of the signal light. The third order crosstalk light component represented by the thick line leaves along exactly the same optical path as that of the signal light. Generally, the first and third order crosstalk light components leave along an optical path different from the optical path of the signal light. If the distance between the recording layers has a particular value, some components of the crosstalk light leave along the same optical path as the signal light beam as shown in FIG. 18A. These components are referred to as the "confocal crosstalk (light)."

In FIGS. 18A, 18B, and 18C, one light beam incident at a certain incident angle is shown. However, in reality, a large number of light beams are included within a fixed range of incident angle, and these light beams are condensed at the focal point. Although the confocal crosstalk light is condensed at a point different from the focal point of the signal light beam in the optical recording medium, outside the optical recording medium it acts as a divergent spherical wave originated from the same focal point as the signal light beam.

The above object is achieved according to the present invention by providing an optical recording medium capable of effectively reducing the overall crosstalk through reducing the above-mentioned confocal third order crosstalk.

In summary, the above-described objectives are achieved by the following aspect of embodiments.

(1) An optical recording medium comprising: a substrate; an optically transparent cover layer; at least three recording layers including an L0 layer, an L1 layer, and an L2 layer provided between the substrate and the optically transparent cover layer, the recording layers laminated in this order from the substrates side; and optically transparent spacer layers each provided between the recording layers, wherein at least one recording layer from among the recording layers except the L0 layer has a negative dependence of the reflectance on an incident angle of a laser light beam for reproduction.

(2) The optical recording medium according to (1), wherein: the recording layer having the negative dependence of the reflectance on the incident angle comprises a recording film and optically transparent protective films sandwiching the recording film from both sides in the thickness direction; and the refractive index of the recording film is larger than those of the optically transparent protective films.

(3) The optical recording medium according to (2), wherein the refractive indices of the optically transparent protective films are set in a range of from 2.1 to 2.5 when the thickness t of the recording film is $0 < t \leq 5$ nm.

(4) The optical recording medium according to (2), wherein the refractive indices of the optically transparent protective films are set in a range of from 1.9 to 2.35 when the thickness t of the recording film is 5<t≦30 nm.

(5) The optical recording medium according to any one of (1) to (4), wherein the recording layer having the negative dependence of the reflectance on the incident angle includes a recording film, a thickness thereof being 0<t≦30 nm.

(6) The optical recording medium according to any one of (1) to (5), wherein the recording layer having the negative dependence of the reflectance on the incident angle has a relative reflectance Rth of 0.9 or less at a beam spot diameter position of the recording layer, the relative reflectance being defined as a ratio of the reflectance at the incident angle θ of a laser light for reproduction to the reflectance at an incident angle of 0°.

(7) The optical recording medium according to any one of (1) to (5), wherein the recording layer having the negative dependence of the reflectance on the incident angle has a relative reflectance Rth of 0.85 or less at a beam spot diameter position of the recording layer, the relative reflectance being defined as a ratio of the reflectance at the incident angle θ of a laser light for reproduction to the reflectance at an incident angle of 0°.

The angle θ is given by $\theta = \sin^{-1}(NA/n)$, wherein n is the refractive index of the optically transparent spacer layer or the refractive index of the optically transparent cover layer, and NA is the numerical aperture of the objective lens of an optical system for reproduction laser light.

The present invention provides an optical recording medium comprising: a substrate; an optically transparent cover layer; at least three recording layers including an L0 layer, an L1 layer, and an L2 layer provided between the substrate and the optically transparent cover layer, the recording layers laminated in this order from the substrates side; and optically transparent spacer layers each provided between the recording layers, wherein at least one recording layer from among the recording layers except the L0 layer has a negative dependence of the reflectance on an incident angle of a laser light beam for reproduction. The reflectance can be reduced through utilizing an incident angle distribution of the crosstalk light incident on a reflection plane under a defocused state. In this manner, the effect of interlayer crosstalk can be significantly reduced.

DETAILED DESCRIPTION OF THE PREFERRED EMBODIMENTS

An optical recording medium comprises, between a substrate and an optically transparent cover layer (hereinafter referred to as a cover layer), recording layers including an L0 layer, an L1 layer, an L2 layer, and an L3 layer laminated in this order from the substrate side and also comprises optically transparent spacer layers (hereinafter referred to as a spacer layer) each provided between the recording layers. The above object is achieved by adjusting the thickness t of the recording film of the L2 layer to 0<t≦30 nm.

Figure 1:
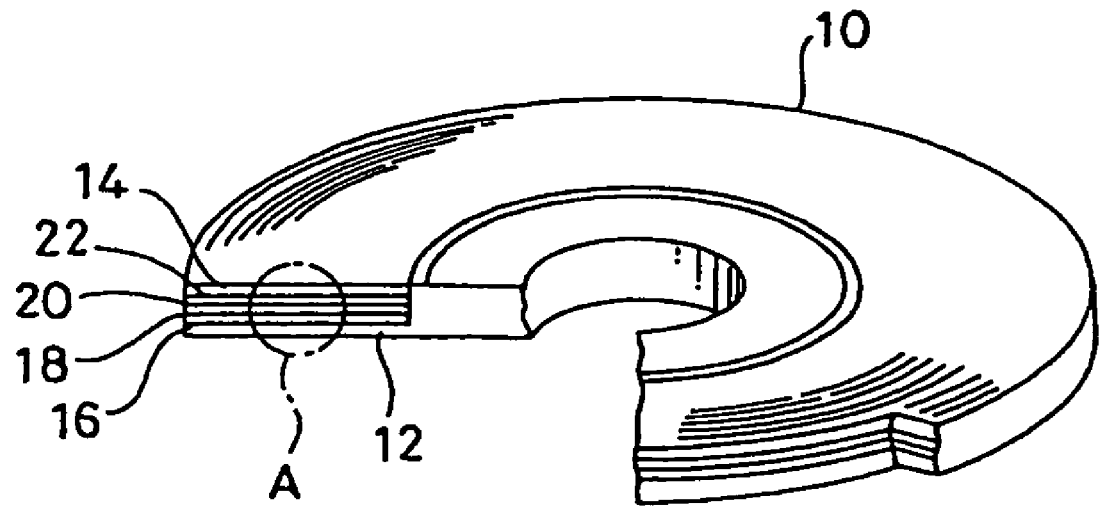
FIG. 1 is a perspective view, partly in section, showing the optical recording medium according one exemplary embodiment of the present invention.

Next, an exemplary embodiment of the present invention shown in FIGS. 1 and 2 will be described.

The optical recording medium 10 according to this exemplary embodiment is formed by laminating, between a substrate 12 and a cover layer 14, four recording layers including an L0 layer 16, an L1 layer 18, an L2 layer 20, and an L3 layer 22 and spacer layers 17, 19, and 21 each provided between the recording layers.

As described below, the L2 layer 20 is configured to have the negative dependence of the reflectance on the incident angle of a laser light beam for reproduction.

Figure 3:
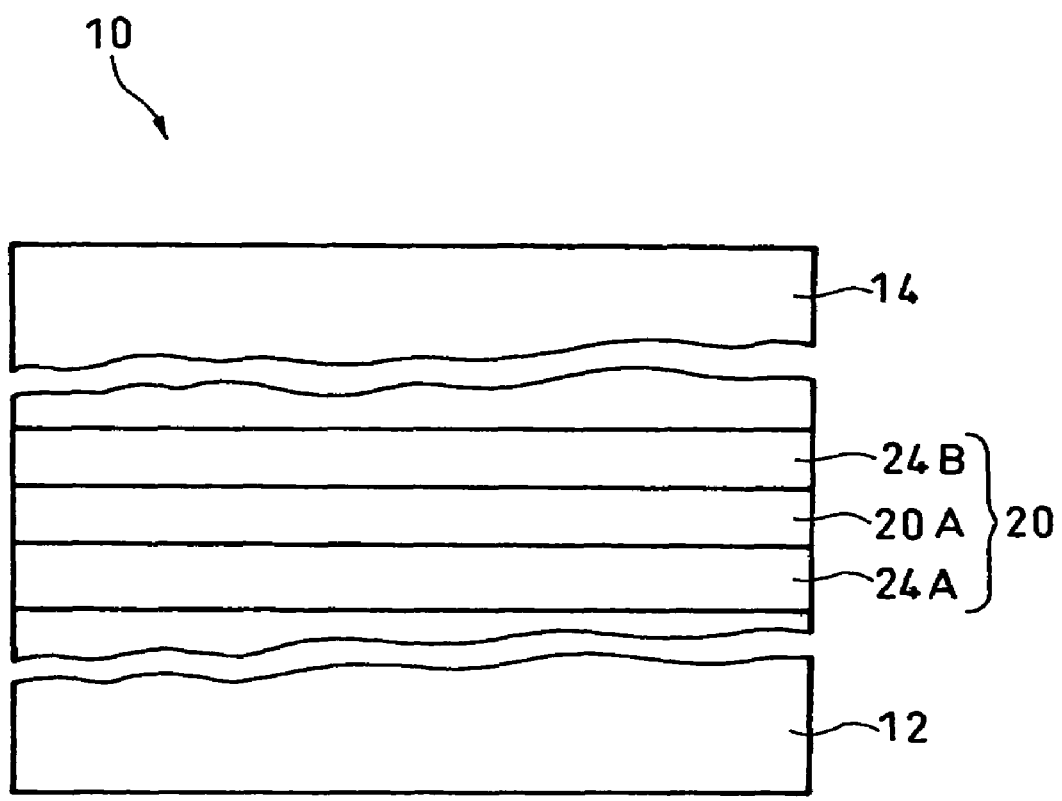
FIG. 3 is a schematic enlarged cross-sectional view showing the L2 layer in the optical recording medium.

In detail, as shown in FIG. 3, the L2 layer 20 is formed of a recording film 20A and optically transparent protective films (hereinafter referred to as protective films) 24A and 24B sandwiching the recording film 20A from both sides in the thickness direction. The refractive index of the recording film 20A is larger than the refractive indices of the protective films 24A and 24B, and the thickness t of the recording film 20A is 0<t≦30 nm. The refractive indices of the protective films 24A and 24B are set in the range of from 2.1 to 2.5 when 0<t≦5 nm, and in the range of from 1.9 to 2.35 when 5<t≦30 nm.

The configuration of the optical recording medium 10 as described above can significantly reduce the intensity of the crosstalk light generated by reflection from the L2 layer 20 upon reproduction from the L0 layer 16 as compared with the intensity of signal light. Thus, the effect of the crosstalk light can be suppressed.

Next, the mechanism of action to reduce the effect of crosstalk light will be described with reference to the drawings.

Figure 2:
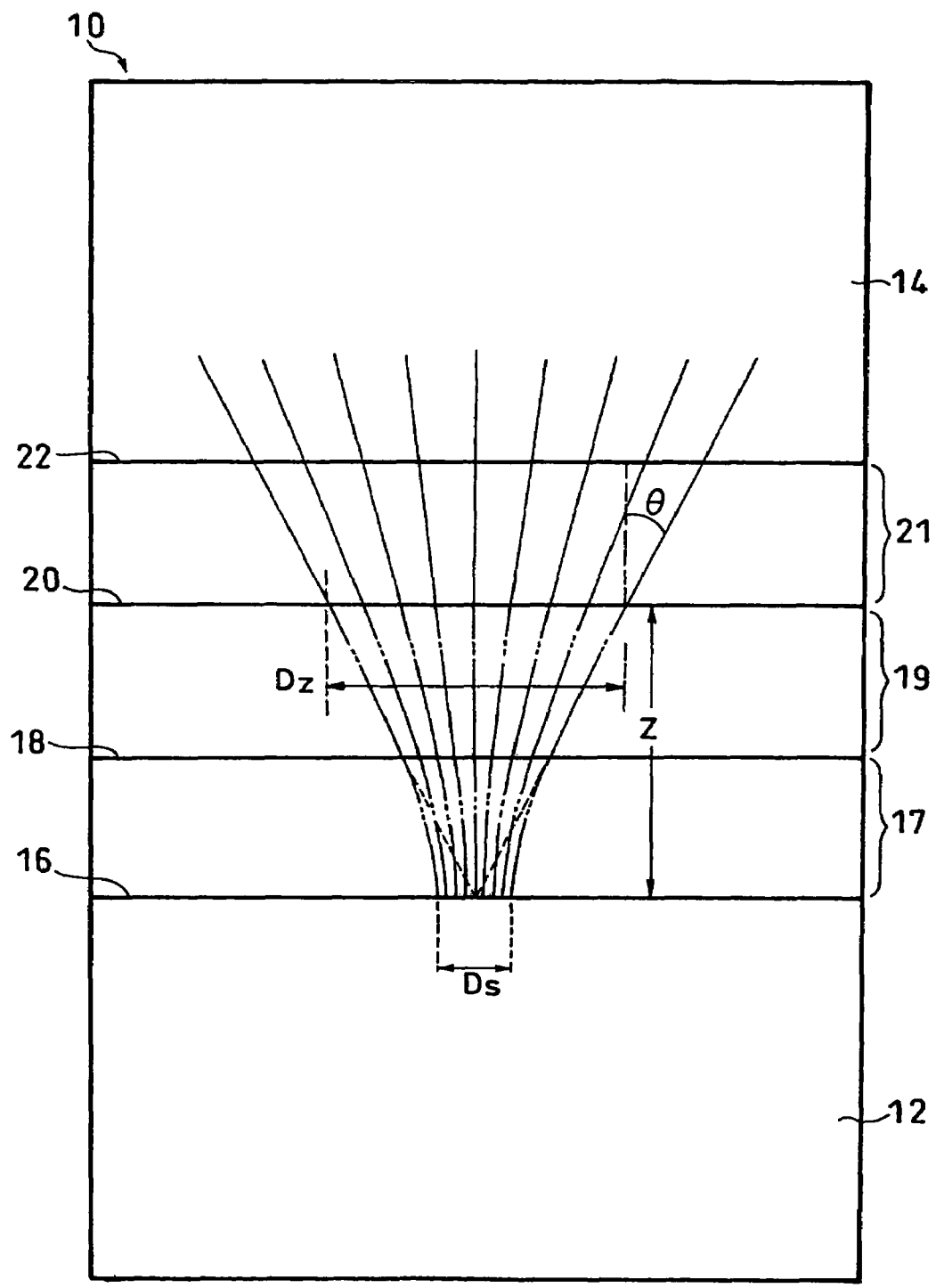
FIG. 2 is a schematic enlarged cross-sectional view showing the main portion of the optical recording medium according the exemplary embodiment of the present invention.
Figure 4:
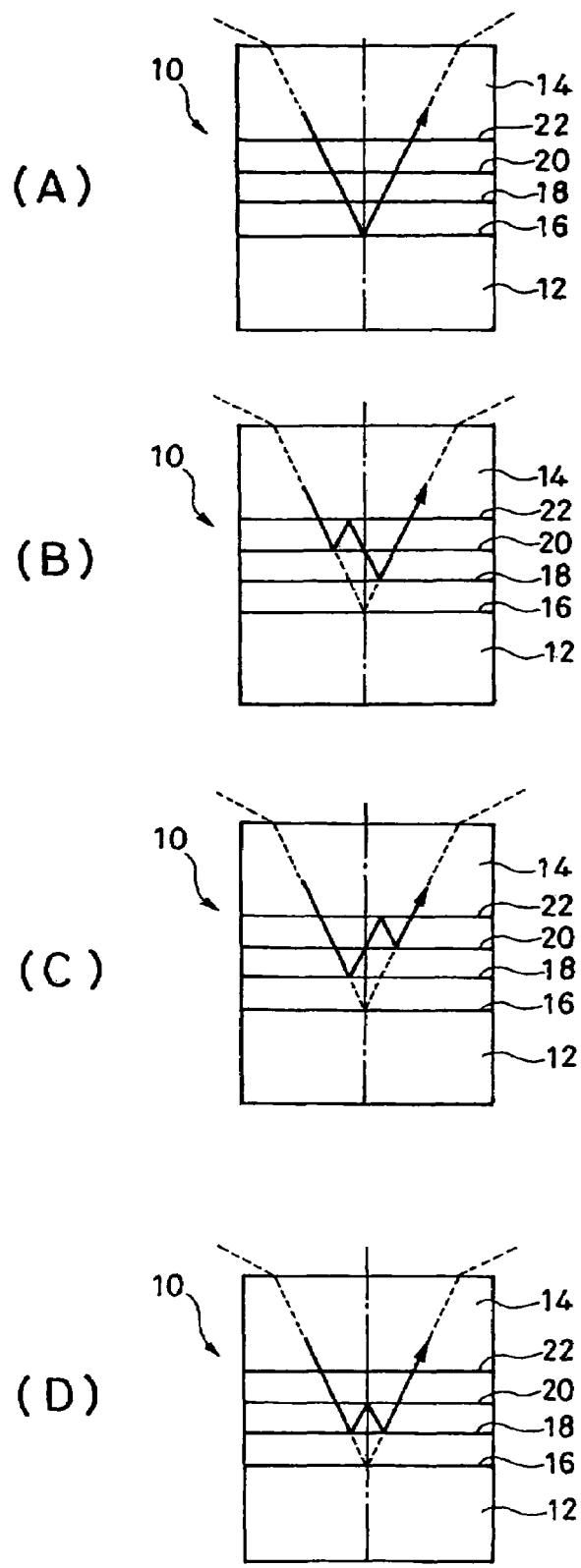
FIGS. 4A to 4D are schematic cross-sectional views showing the optical paths of the signal light and the crosstalk light upon reproduction from an L0 layer in a general four-layer optical recording medium.

First, in a four-layer optical recording medium such as the optical recording medium 10 shown in FIG. 2, the signal light has an optical path shown in FIG. 4A upon reproduction from the L0 layer.

In this case, only three patterns of crosstalk light confocal to the signal light are generated as shown in FIGS. 4B, 4C, and 4D. Here, all of the spaces between the recording layers are assumed to be the same.

Since the crosstalk light shown in each of FIGS. 4B to 4D is confocal to the signal light shown in FIG. 4A, the cross talk light acts as if it is incident on and reflected from the L0 layer 16 serving as a focal plane. In this case, although the signal light is reflected after being condensed on the L0 layer 16, the crosstalk light is incident on and reflected from a reflection plane under a defocused state in which the crosstalk light is not condensed.

FIGS. 5A to 5D show the optical path incident on the reflection plane for each of the reflections of the signal light shown in FIG. 4A and the crosstalk light shown in FIG. 4B.

Figure 5:
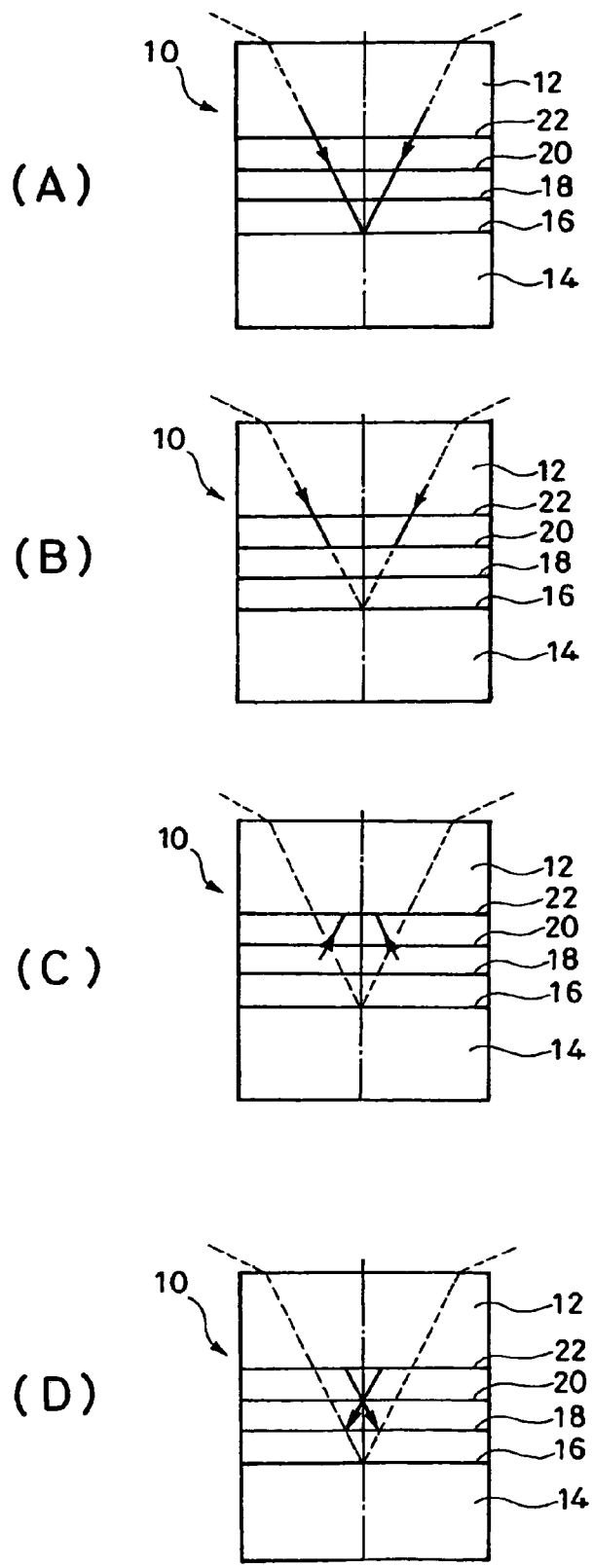
FIGS. 5A to 5D are schematic cross-sectional views showing the optical path incident on the reflection plane for each of the reflections in the signal light shown in FIG. 4A and the crosstalk light shown in FIG. 4B.

As can be seen in these figures, the focal and reflection planes of the signal light are the same as shown in FIG. 5A. For the crosstalk light shown in FIG. 5B, the L2 layer 20 serves as the reflection plane, but the L0 layer 16 serves as the focal plane. Therefore, the reflection occurs under a defocused state.

FIG. 2 shows an enlarged view of the optical paths of the crosstalk light in the vicinity of the L2 layer 20 (the reflection plane). In FIG. 2, the solid lines represent the actual optical paths, and the chain double-dashed lines represent virtual optical paths drawn by extending the actual optical paths from the L2 layer 20 to the L0 layer 16. In addition, FIG. 6 shows an enlarged view of the optical paths of the signal light in the vicinity of the L0 layer 16 (the reflection plane).

Figure 6:
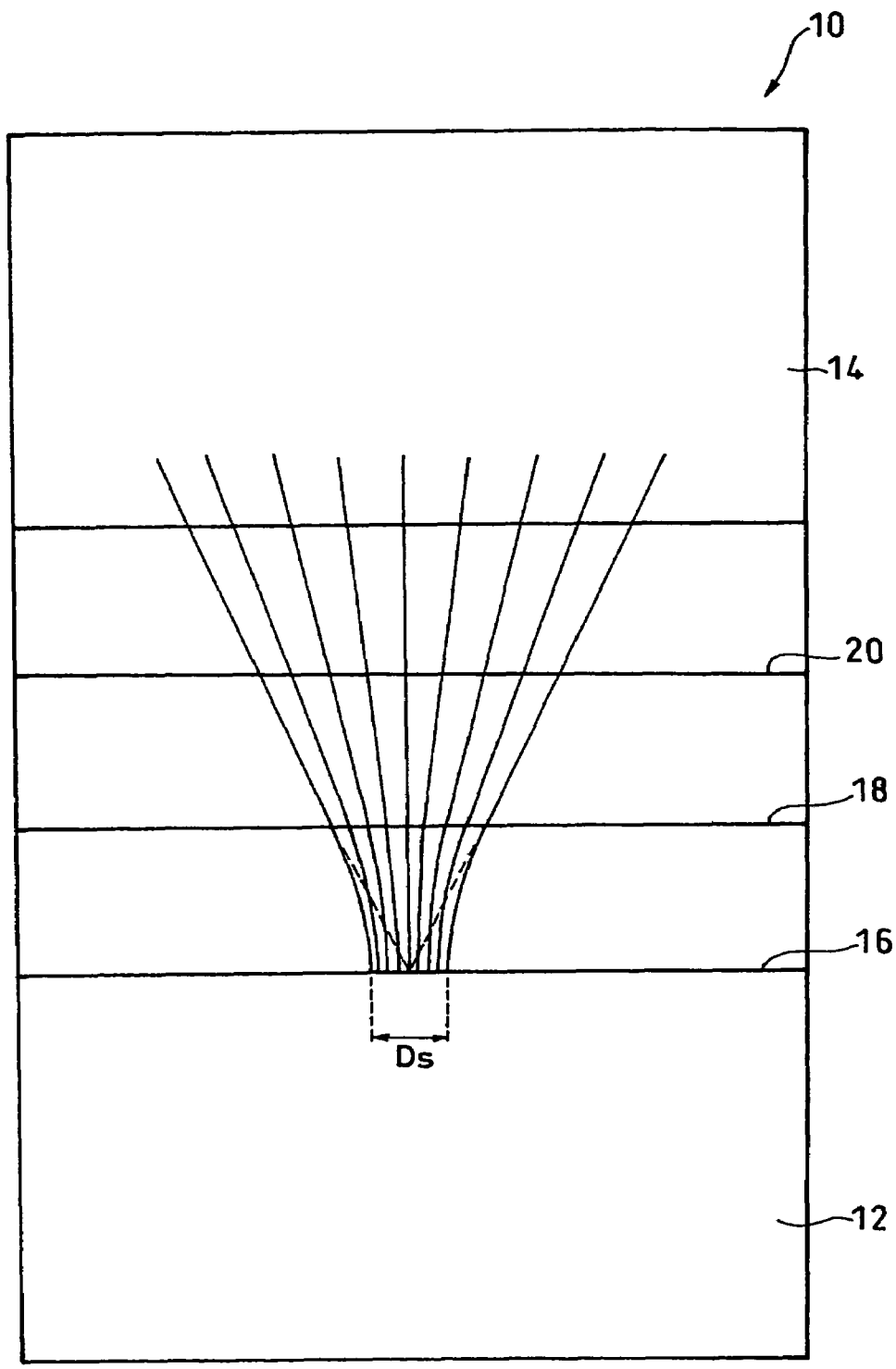
FIG. 6 is a schematic enlarged cross-sectional view showing the incident state of a laser beam for reproduction on the L0 layer of the optical recording medium according to the exemplary embodiment of the present invention.

As shown in FIG. 6, for the signal light, the focal plane and the reflection plane of the incident light are the L0 layer 16, and thus both of the planes are the same. The dashed lines in FIGS. 2 and 6 represent geometrical optical paths. However, the actual optical paths do not coincide with the geometrical optical paths in the vicinity of the focal plane due to the wave properties of light. Thus, the actual optical paths have a finite spot size (Ds, referred to as the diffraction limit) on the focal plane.

In the case of the signal light shown in FIG. 6, the laser light for reproduction has been restricted by an objective lens, and thus the laser light is incident on the optical recording medium nearly as a spherical wave. However, the laser light can be considered as a plane wave having a planar wavefront in the vicinity of the focal plane. Generally, the recording layer of the optical recording medium has a multilayer structure formed of a plurality of laminated thin films. Thus, since the incident light as described above can be considered as a plane wave, the light beams in the beam spot exhibit the nearly same optical properties (reflectance, absorbance, and transmittance).

On the other hand, the crosstalk light is incident on the L2 layer 20 serving as the reflection plane under a defocused state, as shown in FIG. 2. On the reflection plane (the L2 layer 20) which is positioned apart from the L0 layer 16 serving as the focal plane, the optical path of the crosstalk light coincides with the geometrical optical path, and thus the crosstalk light has a distribution of the incident angle.

The actual optical path is significantly different from the geometrical optical path at up to a distance from the focal plane being about the wavelength. Generally, the distance between the recording layers is about 10 to 20 μm in a multilayer optical recording medium. This is sufficiently larger than the wavelength, and thus the crosstalk light is considered to follow the geometrical optical path on the reflection plane.

That is, the crosstalk light is incident on the focal plane with the incident angle distribution shown in FIG. 2, and follows the optical path originated from the focal plane. On the other hand, since the signal light can be considered to be a plane wave in the vicinity of the focal plane as described above, the signal light does not have a distribution of the incident angle. Therefore, if the reflectance of the L2 layer 20 serving as the reflection plane of the crosstalk light has the negative dependence on the incident angle, the intensity of the crosstalk light is significantly reduced as compared with that of the signal light, thereby suppressing the effect of the crosstalk.

Next, the reason that the intensity of the crosstalk light can be reduced if the reflective layer has the negative dependence of the reflectance on the incident angle will be described in more detail.

Figure 11:
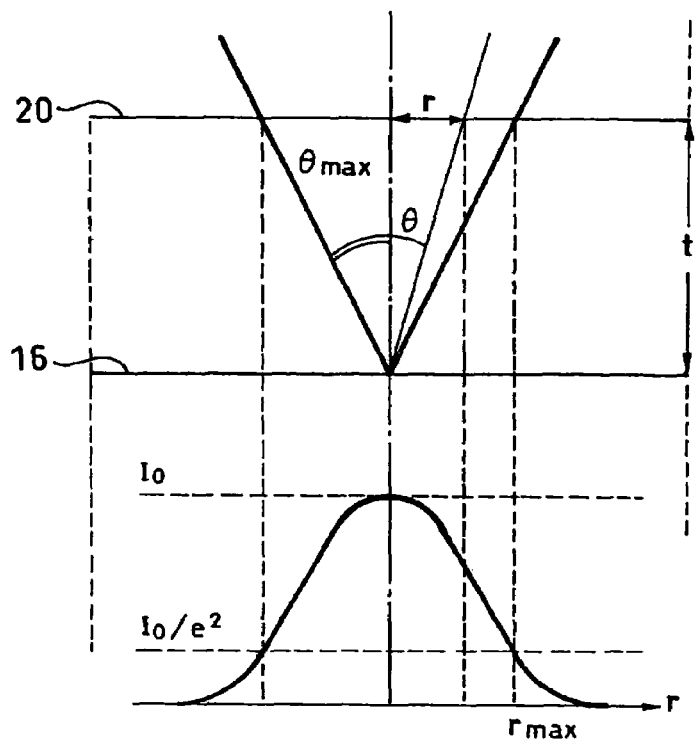
FIG. 11 is a graph showing the relation between the L0 layer to be reproduced and the recording layer serving as the reflection layer and showing the intensity distribution of the laser beam for reproduction at the position of the reflection layer.

In FIG. 2, Ds is a beam spot diameter of the crosstalk light on the focal plane, z is the distance between the focal plane (the L0 layer 16) and the reflection plane (the L2 layer 20), Dz is a beam spot diameter on the reflection plane, and θ is an incident angle on the reflection plane. In addition, for example, the wavelength λ of the laser light for reproduction is 405 nm, the numerical aperture NA of an objective lens is 0.85, and the cover layer 14 and the spacer layers 17, 19, and 21 of the optical recording medium are made of an ultraviolet-ray curable resin having a refractive index n of 1.56. In this case, Dz is 13.00 μm when z=10 μm. The intensity distribution of the laser beam for reproduction is a Gaussian distribution. Assuming that Dz coincides with the beam diameter at which the intensity is $1/e^2$ of the central intensity, the intensity distribution of the laser beam for reproduction can be represented as shown in FIG. 11.

Figure 7:
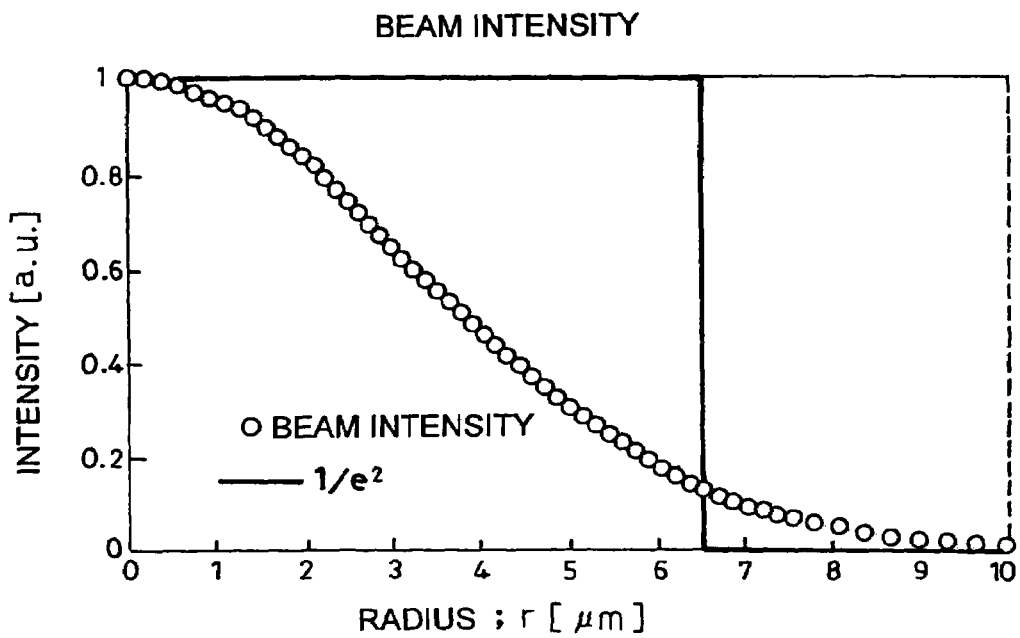
FIG. 7 is a graph showing the radius of the beam spot on a focal plane and the intensity distribution of a laser beam for reproduction.

The intensity distribution of the laser beam for reproduction is more accurately shown in FIG. 7. The intensity at the position corresponding to a beam spot diameter Dz of 13.00 μm is $1/e^2$ of the central intensity. The relation r=z tan θ holds between the radius on the reflection plane and the incident angle θ. If the reflectance of the L2 layer 20 has the negative dependence on the incident angle as shown in FIG. 8, the reflectance of the L2 layer 20 for the optical paths shown in FIG. 2 is lower than the reflectance of perpendicular incident, resulting in the reduction of the crosstalk.

That is, if the reflectance at a finite incident angle θ (the convergent angle to the focal plane is 2θ) is smaller than the reflectance of the perpendicular incident (the incident angle=0°) of the laser beam for reproduction, the relative amount of the crosstalk light decreases, resulting in the reduction of the crosstalk.

Next, a procedure for quantitatively calculating the effectiveness of the crosstalk light reduction obtained by the negative dependence of the reflectance of the recording layer on the incident angle will be described.

Figure 8:
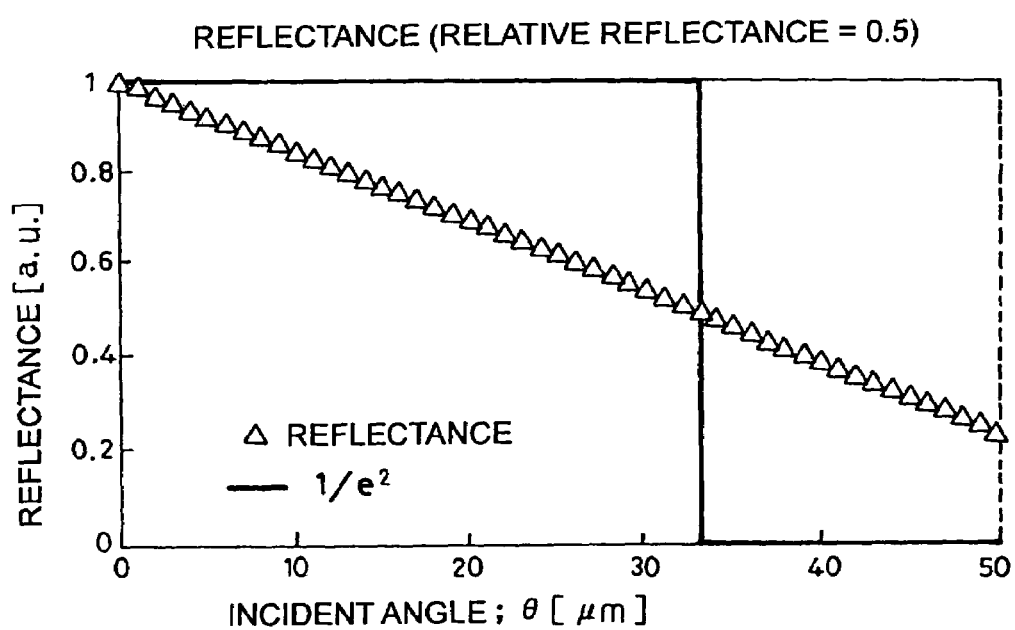
FIG. 8 is a graph showing the relation between the incident angle θ of a laser beam for reproduction onto the recording layer serving as the reflection plane and the reflectance.

First, assuming that the reflectance changes as shown in FIG. 8, the effectiveness of the crosstalk light reduction was quantitatively calculated. Each of the thick lines in FIGS. 7 and 8 corresponds to a trajectory of an intensity of $1/e^2$ (i.e., the beam spot diameter). The relative reflectance (normalized by the reflectance of perpendicular incident) linearly decreases with respect to the incident angle θ, and was set to Rth at the angle corresponding to the beam spot radius.

The relative reflectance Rth is 0.5 in FIG. 8. The intensity distribution shown in FIG. 7 is represented by I(r), the distance between the focal plane and the reflection plane is represented by s. Also, the relative reflectance shown in FIG. 8 is represented by R[θ(r)], and θ(r)=$\tan^{-1}$(r/s). Thus, the relative intensity of the crosstalk light is represented by, $$\text{Relative intensity} = \int_0^\infty I(r) R[\theta(r)] \times 2\pi r \, dr. \quad (1)$$

Figure 9:
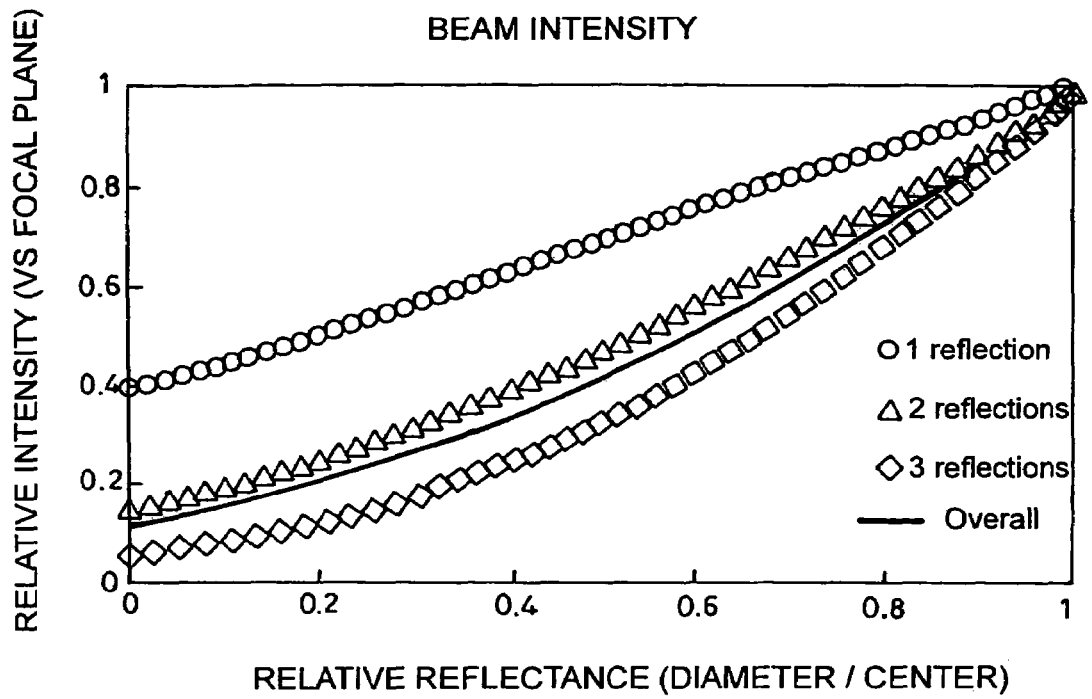
FIG. 9 is a graph showing the relation between the relative reflectance within the beam spot on the recording layer relative to the reflectance of the laser beam for reproduction at an incident beam angle of 0° and the relative intensity of the beam relative to the focal plane.

FIG. 9 shows the relative crosstalk intensity calculated by use of the equation (1) with respect to the parameter Rth (the relative reflectance) which represents the dependence of the reflectance on the incident angle. The relative crosstalk intensity shown in FIG. 9 is a value divided by the value calculated through assuming the signal intensity or the reflectance does not depend on the incident angle (i.e., the relative crosstalk intensity at a relative reflectance of 1 is 1).

The crosstalk intensity of the crosstalk light outgoing from the optical recording medium as shown in FIGS. 4B and 4C is given by the cube of the value calculated by use of the equation (1) since the cross light is reflected three times under a defocused state. Similarly, the intensity of the crosstalk light shown in FIG. 4D is given by the square of the value calculated by use of the equation (1) since the crosstalk light is reflected from the L2 layer 20 under a focused state and is reflected two times under a defocused state. Since the percent contributions of the crosstalk components shown in FIGS. 4B to 4D to the overall crosstalk are not the same, the average relative intensity was calculated by taking into account the percent contributions and is shown by the thick line in FIG. 9.

As shown in FIG. 9, the relative reflectance is preferably 90% or lower if the recognizable effectiveness of the crosstalk reduction is set to, for example, 10%. The relative reflectance is more preferably 85% or lower if the effectiveness of the crosstalk reduction is set to 20% or higher.

Next, a specific configuration of the recording layer having the negative dependence of the reflectance on the incident angle of a laser beam for reproduction as described above will be described.

When the recording film 20A of the recording layer (the L2 layer 20) serving as the reflection plane of crosstalk light is sandwiched between the protective films 24A and 24B from both sides in the thickness direction, as enlarged in FIG. 3, the refractive index $n_2$ of the recording film 20A is set to be larger than the refractive indices $n_{21}$ of the protective films 24A and 24B.

The refractive indices $n_{21}$ of the protective films 24A and 24B are set in the range of from 2.1 to 2.5 when the thickness t of the recording film 20A is 0<t≦5 nm, and is set in the range of from 1.9 to 2.35 when 5<t≦30 nm.

Further, the relative reflectance Rth of the L2 layer 20, which is defined at an incident angle of θ and is normalized by the reflectance when a laser light for reproduction is incident at an incident angle of 0°, is set to 0.9 or less, preferably 0.85 or less at the beam spot position of the L2 layer 20.

The detail of the above conditions will next be described.

Figure 10:
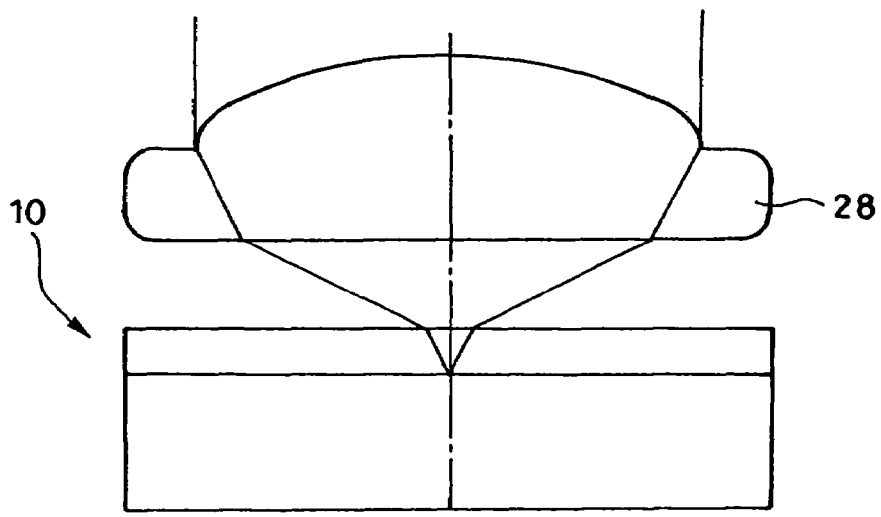
FIG. 10 is an optical layout view showing a general optical system for reproducing a multilayer optical recording medium.

The angle dependence of the reflectance on the L2 layer 20 will be described upon reproduction from the L0 layer 16 through projecting a laser beam for reproduction on the optical recording medium 10 through an objective lens 28 in an optical system shown in FIG. 10.

FIG. 11 shows the optical path in the vicinity of the L0 layer to the L2 layer shown in FIG. 2 and the intensity distribution of the incident light beam.

If a wavelength of a laser beam for reproduction of 405 nm, a numerical aperture NA of the objective lens of 0.85, and refractive indices $n_0$ and $n_s$ of the cover layer and the spacer layer, respectively, of 1.56 are employed in the optical recording medium as optical parameters conforming to the Blu-ray (trademark) standard, the maximum incident angle of the laser beam for reproduction becomes θ≈58.2° in air and $\theta_{max}$≈33.0° in the cover layer and the spacer layer.

In the configuration of the L2 layer 20 shown in FIG. 3, the number of films, the material for the films, and the thickness of the films are practically determined in accordance with the required recording properties. However, a simple three-layer structure is employed in the description hereinbelow.

The protective films 24A and 24B are formed of a dielectric material having a resistance to temperature variation, and, for example, zinc sulfide, silicon oxide, or a mixture thereof is employed for the material. For the recording layer, for example, a phase change recording material such as germanium, antimony, or tellurium, an organic recording material such as cyanine dye, a photopolymer, a photorefractive material, or the like is employed. In this exemplary embodiment, bismuth oxide (complex refractive index $n_2$=2.45−0.28i) capable of write-once recording is employed. An ultraviolet-ray curable resin is employed for the cover layer and the spacer layer, and a polycarbonate material or a glass material is employed for the substrate.

Next, the reflectance, transmittance, and absorbance were calculated for the three-layer structure shown in FIG. 3 by changing the refractive indices $n_{21}$ of the protective films 24A and 24B from 1.9 to 2.5, the thickness t of the recording layer 20A in the range of 0<t<500 nm, and the incident angle θ in the range of 0°<θ<90°. The incident angle θ represents the angle in the cover layer, and the contribution from the light reflected from the upper surface of the cover layer, the bottom surface of the L2 layer 20 and the substrate are not included.

Figure 12:
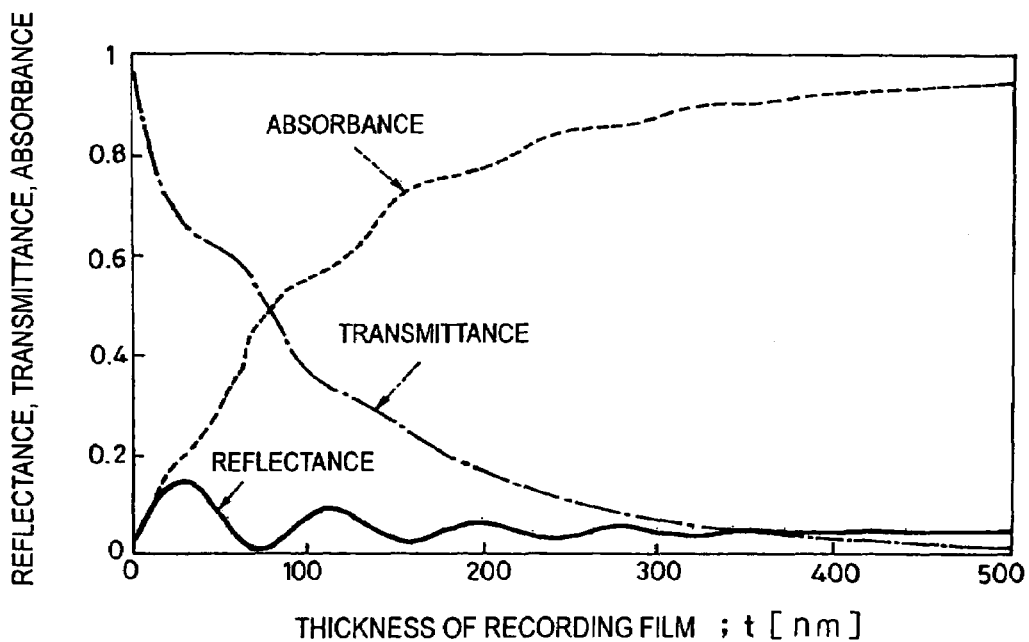
FIG. 12 is a graph showing the relation between the film thickness of the recording layer and the reflectance, transmittance, and absorbance of the laser beam for reproduction.

First, the changes of the reflectance, transmittance, and absorbance were calculated by changing the thickness of the recording film at a refractive index $n_{21}$ of the protective film of 2.2 and an incident angle of 0°, and the results are shown in FIG. 12. Generally, the recording layers, except the L0 layer, require a transmittance of 50% or more for allowing the beam for recording on and reproducing from a recording layer located on the substrate side to pass through. Therefore, as can be seen in FIG. 12, the thickness of the recording film is preferably 80 nm or less.

Figure 13:
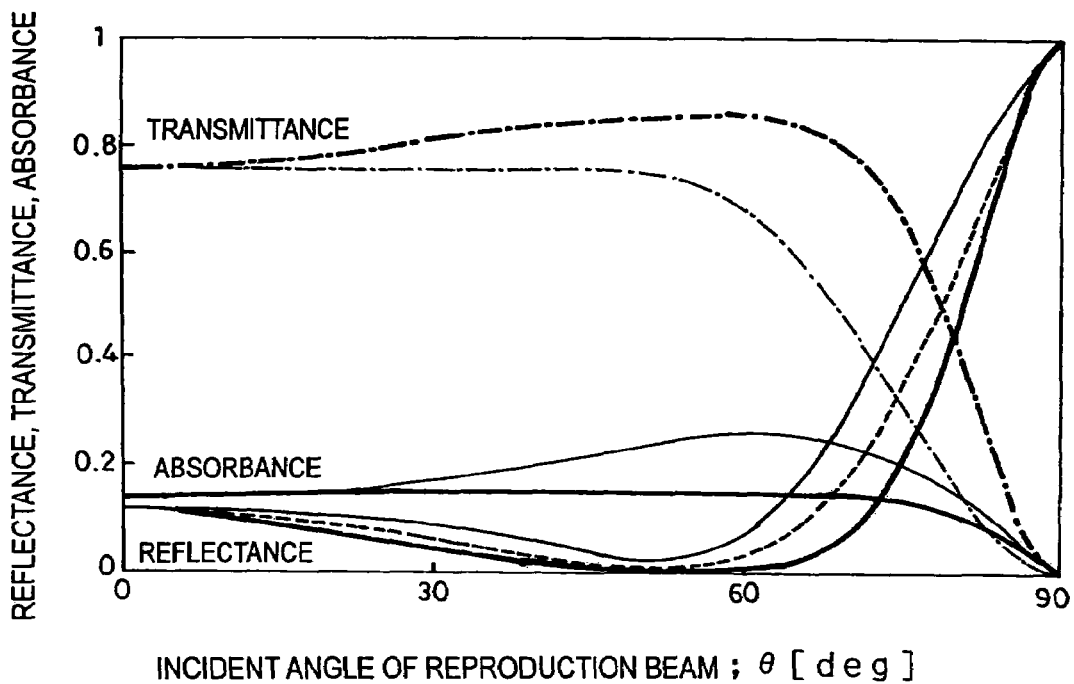
FIG. 13 is a graph showing the relation between the incident angle of the laser beam for reproduction and the reflectance, transmittance, and absorbance in the recording layer.
Figure 14:
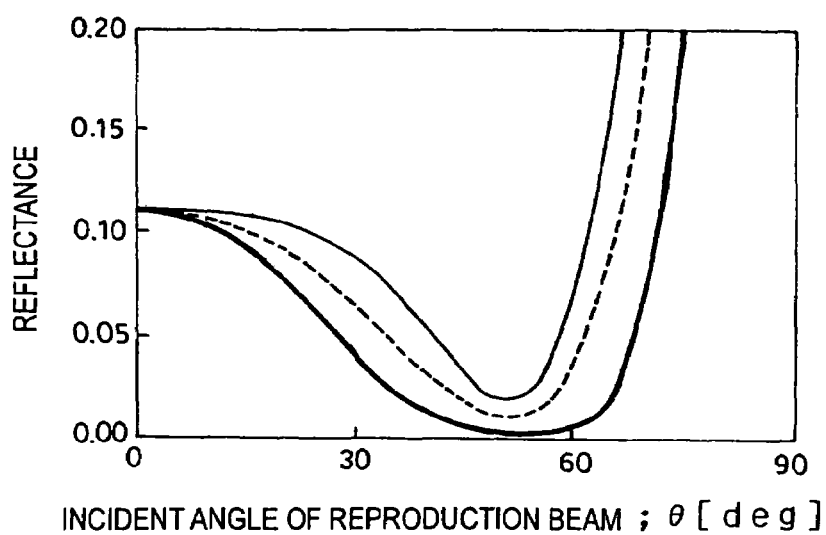
FIG. 14 is a graph showing only the reflectance shown in FIG. 13, a portion having a reflectance of 0 to 0.2 being enlarged.

The reflectance, transmittance, and absorbance were calculated by changing the incident angle θ of the laser beam for reproduction at a thickness of the recording film 20A of 15 nm, and the results are shown in FIG. 13. In FIG. 14, the portion having a reflectance of 0.00 to 0.20 in FIG. 13 is enlarged.

In FIGS. 13 and 14, the results for two polarization states are plotted in the same figure since the reflectance, transmittance, and absorbance depend on the polarization state of the laser beam for reproduction when the incident angle is finite ($\theta > 0°$). In these figures, the thin lines are the results for s-polarization (the electric field vector is directed perpendicular to the drawing in FIG. 11), and the thick lines are the results for p-polarization. The broken lines represent the arithmetic mean of these results. In the optical pickup of a practical optical recording system, a nearly circularly polarized laser beam is employed, and thus the actual situation is represented by the broken lines.

In order to make the description simple, the effectiveness of crosstalk reduction is evaluated by use of the ratio of the reflectance at $\theta=33°$ to the reflectance at $\theta=0°$.

For example, in FIG. 14, the reflectance R(0) at $\theta=0°$ is 0.1109, and the reflectance R(33) at $0=33°$ is 0.0539. Therefore, the relative reflectance Rth=R(33)/R(0)=0.0539/0.1109=0.486. In the example shown in FIG. 13, the reflectance decreases monotonically in the range of $0°<\theta\leq33°$.

Figure 15:
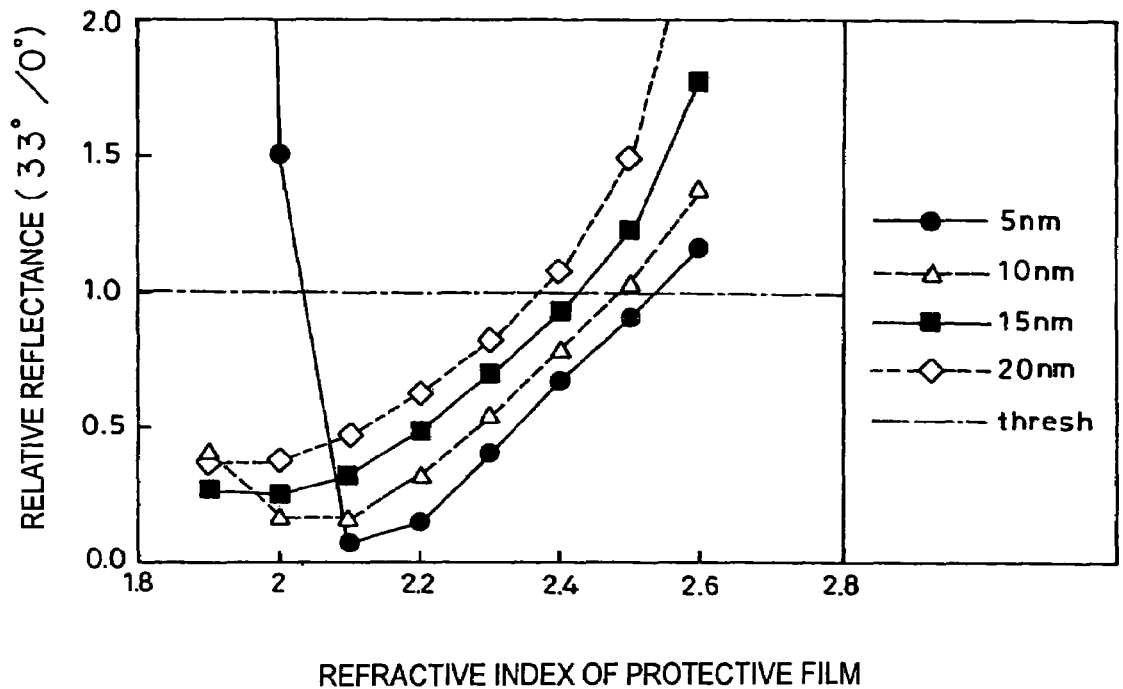
FIG. 15 is a graph showing the relation between the reflectance ratio of the reflectance at an incident angle of 33° to the reflectance at an incident angle of 0° and the refractive index of the protective film for each film thickness of the recording layer.

FIG. 15 shows the change of the relative reflectance Rth upon changing the refractive index of the protective films 24A and 24B and the thickness of the recording layer.

As can be seen in FIG. 15, the relative reflectance Rth tends to decrease as the refractive index decreases for any film thickness. Particularly, for a thickness of the recording layer of 5 nm, the relative reflectance Rth falls below 1.0 when the refractive index of the protective film is in the range of from 2.1 to 2.5. The relative reflectance Rth monotonically increases when the refractive index of the protective film is in the range of from 1.9 to 2.4 for thicknesses of the recording film of 10 and 15 nm and when the refractive index of the protective film is in the range of from 1.9 to 2.45 for a film thickness of the recording film of 20 nm. The relative reflectance Rth relative to the reflectance at $\theta=0°$ is plotted in FIG. 16 with respect to the refractive index of the protective film by use of the same data plotted in FIG. 15.

Figure 16:
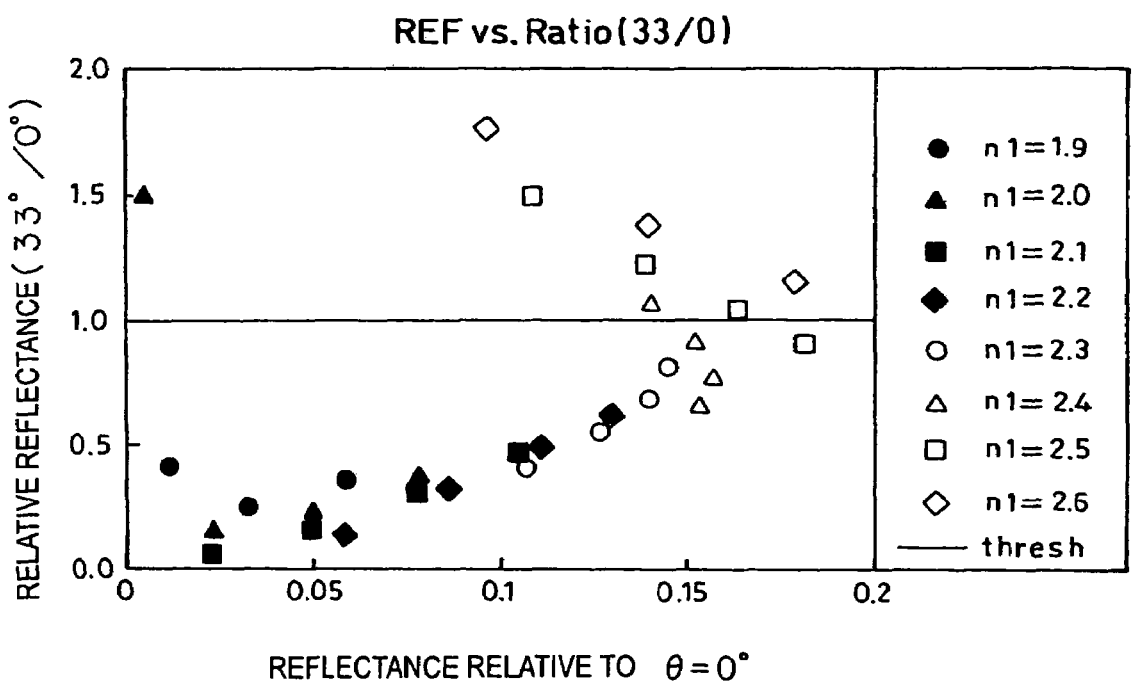
FIG. 16 is a graph showing the relation between the reflectance at an incident angle of the laser beam for reproduction of 0° and the relative reflectance for each refractive index of the protective film.

As can be seen in FIG. 16, the relative reflectance Rth falls below 1.0 in a wide reflectance range when the refractive index of the protective film is smaller than the refractive index of the recording layer (2.45). Particularly, if the reflectance of the recording layer is 12% or less, the relative reflectance Rth falls below 0.5. Therefore, a larger effect of crosstalk reduction can be obtained.

In the region where the refractive index of the protective film is larger than the refractive index of the recording layer, the relative reflectance exceeds 1 for all cases, thereby causing the crosstalk to increase.

Figure 17:
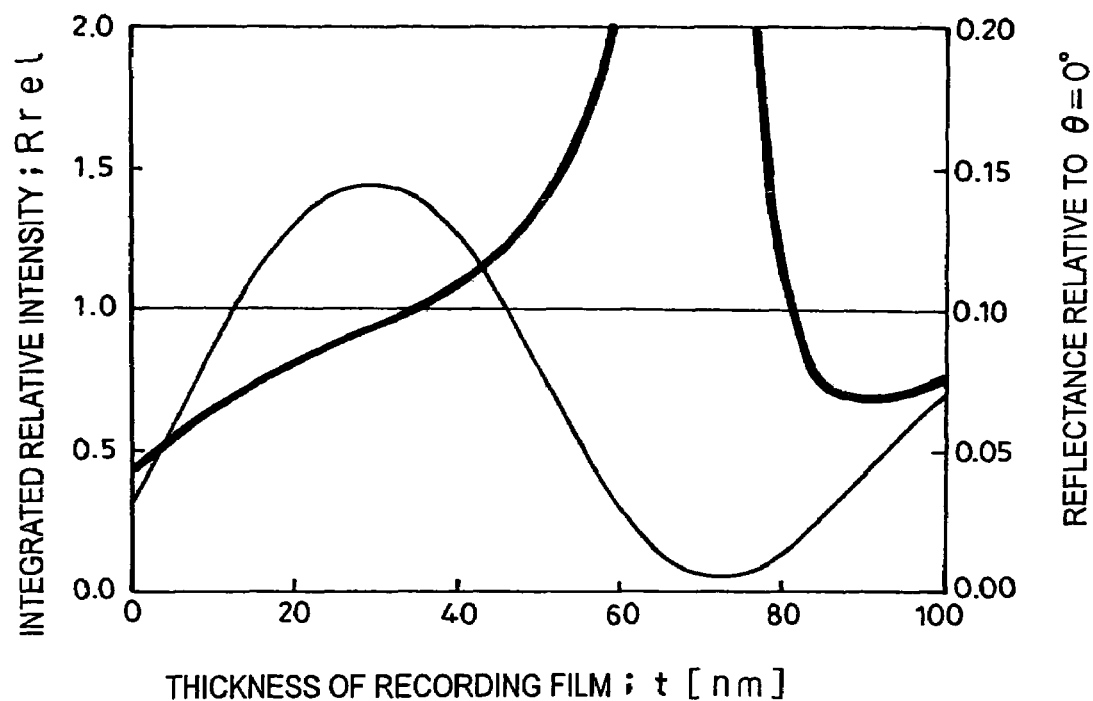
FIG. 17 is a graph showing the relation between the thickness of the recording layer and the integrated relative intensity and the relation between the thickness of the recording layer and the reflectance at an incident angle of 0°.
Figure 18:
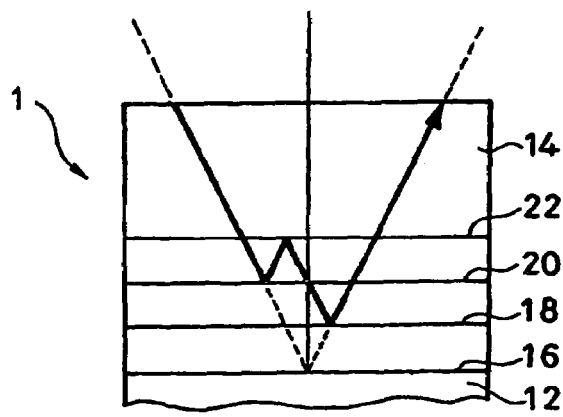
FIGS. 18A to 18C are schematic cross-sectional views showing the confocal crosstalk light in a conventional four-layer optical recording medium.
Figure 18:
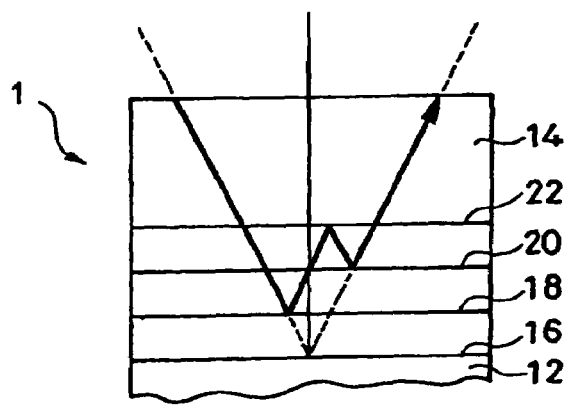
Figure 18:
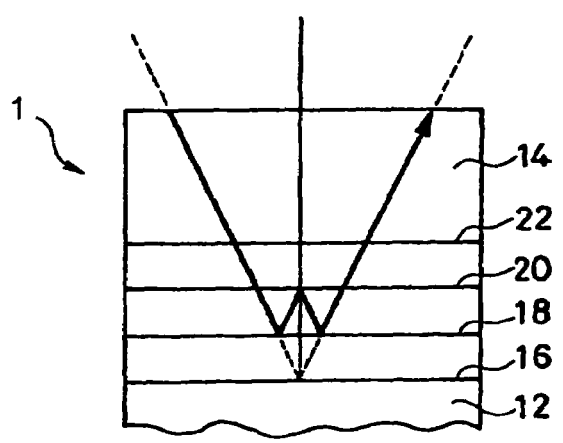

FIG. 17 shows the calculation results of the overall reflection intensity obtained by taking into account the reflectance not only at incident angles $\theta$ of 0° and 33° but also at incident angles therebetween and the intensity distribution of the beam for reproduction.

The intensity of the laser beam for reproduction has a Gaussian distribution with respect to the symbol r in FIG. 11, and the position at which the beam intensity is $1/e^2$ of the maximum intensity (the intensity on the optical axis) is set to coincide with the position of the optical path, which defines the NA of an objective lens, on the L2 layer 20. As shown in FIG. 13, the calculated reflectance is a function of the incident angle $\theta$. The Gaussian distribution was transformed to a function of $\theta$ by use of the relation $r=t \tan \theta$ and was multiplied by the reflectance. The resultant distribution was numerically integrated over the range of $\theta=0$ to 90° to thereby obtain a reflected light intensity.

As a reference intensity for comparison, the reflected light intensity calculated without the angular dependence of the reflectance is suitable. Thus, assuming that the reflectance is constant irrespective of the incident angle (i.e., the value of the reflectance at $\theta=0°$ is employed), the same numerical integration was performed. The value of the reflected light intensity relative to the value of the reference intensity is shown in FIG. 17 by a thick line as an integrated relative intensity Rrel. Also, the reflectance for $\theta=0°$ is represented by a thin line in FIG. 17. The value of the reflectance actually required depends on a system. However, the wide range of the reflectance of 4 to 14% and the integrated relative intensity (crosstalk reduction) falling below 1 can be achieved at the same time in the range of the thickness t of the recording film of 0 to 30 nm.

In the above exemplary embodiment, the optical recording medium comprises four recording layers, but the present invention is applicable to an optical recording medium comprising three or more recording layers.

In addition, in the above exemplary embodiment, the L2 layer has the negative dependence of the reflectance on the incident angle of the laser light for reproduction. However, at least one recording layer from among the recording layers except the L0 layer may have the negative dependence of the reflectance on the incident angle of the laser light for reproduction.

What is claimed is:

1. An optical recording medium comprising:
a substrate;
an optically transparent cover layer;
at least three recording layers including an L0 layer, an L1 layer, and an L2 layer provided between the substrate and the optically transparent cover layer, the recording layers laminated in this order from the substrates side;
optically transparent spacer layers each provided between the recording layers; and
at least one recording layer from among the recording layers except the L0 layer has a negative dependence of the reflectance on an incident angle of a laser light beam for reproduction,
wherein
the recording layer having the negative dependence of the reflectance on the incident angle has a relative reflectance Rth of 0.9 or less at a beam spot diameter position of the recording layer, the relative reflectance being defined as a ratio of the reflectance at the incident angle $\theta$ of a laser light for reproduction to the reflectance at an incident angle of 0°.

2. The optical recording medium according to claim 1 wherein
the recording layer having the negative dependence of the reflectance on the incident angle comprises a recording film and optically transparent protective films sandwiching the recording film from both sides in the thickness direction; and
the refractive index of the recording film is larger than those of the optically transparent protective films.

3. The optical recording medium according to claim 2, wherein
the refractive indices of the optically transparent protective films are set in a range of from 2.1 to 2.5 when the thickness t of the recording film is $0<t\leq5$ nm.

4. The optical recording medium according to claim 2, wherein
the recording indices of the optically transparent protective films are set in a range of from 1.9 to 2.35 when the thickness t of the recording film is $5<t\leq30$ nm.

5. The optical recording medium according to claim 1, wherein
the recording layer having the negative dependence of the reflectance on the incident angle includes a recording film a thickness thereof being $0<t\leq30$ nm.

6. An optical recording medium comprising:
a substrate;
an optically transparent cover layer;

at least three recording layers including an L0 layer, and L1 layer, and an L2 layer provided between the substrate and the optically transparent cover layer, the recording layers laminated in this order from the substrates side;

optically transparent spacer layers each provided between the recording layers; and at least one recording layer from among the recording layers except the L0 layer has a negative dependence of the reflectance on an incident angle of a laser light beam for reproduction, wherein the recording layer having the negative dependence of the reflectance on the incident angle has a relative reflectance Rth of 0.85 or less at a beam spot diameter position of the recording layer, the relative reflectance being defined as a ratio of the reflectance at the incident angle θ of a laser light for reproduction to the reflectance at an incident angle of 0°.

7. The optical recording medium according to claim 6, wherein the recording layer having the negative dependence of the reflectance on the incident angle comprises a recording film and optically transparent protective films sandwiching the recording film from both sides in the thickness direction; and the refractive index of the recording film is larger than those of the optically transparent protective films.

8. The optical recording medium according to claim 7, wherein the refractive indices of the optically transparent protective films are set in a range of from 2.1 to 2.5 when the thickness t of the recording film is $0 < t \leq 5$ nm.

9. The optical recording medium according to claim 7, wherein the refractive indices of the optically transparent protective films are set in a range of from 1.9 to 2.35 when the thickness t of the recording film is $5 < t \leq 30$ nm.

10. The optical recording medium according to claim 6, wherein the recording layer having the negative dependence of the reflectance on the incident angle includes a recording film, a thickness thereof being $0 < t \leq 30$ nm.

* * * * *

UNITED STATES PATENT AND TRADEMARK OFFICE
CERTIFICATE OF CORRECTION

| | | |
|---|---|---|
| PATENT NO. | : 7,675,838 B2 | Page 1 of 1 |
| APPLICATION NO. | : 11/222835 | |
| DATED | : March 9, 2010 | |
| INVENTOR(S) | : Takuya Tsukagoshi et al. | |

It is certified that error appears in the above-identified patent and that said Letters Patent is hereby corrected as shown below:

Title page, section (75), please correct the cities of the 2nd and 3rd inventors as follows:

(75) Inventors: Takuya Tsukagoshi, Sagamihara (JP);

Koji Mishima, please delete "Chuo-ku (JP)" and insert --Tokyo (JP)--;

Daisuke Yoshitoku, please delete "Chuo-ku (JP)" and insert --Tokyo (JP)--.

Signed and Sealed this

Sixth Day of July, 2010

David J. Kappos
*Director of the United States Patent and Trademark Office*